United States Patent [19]
Ichimura et al.

[11] 3,813,964
[45] June 4, 1974

[54] CONTROL SYSTEM FOR AN AUTOMOTIVE AUTOMATIC POWER TRANSMISSION

[75] Inventors: Hirohisa Ichimura; Namio Irie, both of Yokohama, Japan

[73] Assignee: Nissan Motor Company Limited, Yokohama, Japan

[22] Filed: Sept. 29, 1972

[21] Appl. No.: 293,472

Related U.S. Application Data

[63] Continuation-in-part of Ser. No. 80,311, Oct. 13, 1970, abandoned.

[30] Foreign Application Priority Data
Oct. 18, 1969   Japan.............................. 44-83062
Nov. 4, 1969   Japan.............................. 44-87728

[52] U.S. Cl.................. 74/866, 74/864, 74/752 A, 74/731, 74/869
[51] Int. Cl. ..... B60k 21/00, F16h 3/74, F16h 47/00
[58] Field of Search................. 74/866, 731, 752 A; 692/109

[56] References Cited
UNITED STATES PATENTS

| | | | |
|---|---|---|---|
| 3,019,666 | 2/1962 | Brennan et al. ...................... | 74/866 |
| 3,433,101 | 3/1969 | Scholl et al. ......................... | 74/866 |
| 3,448,640 | 6/1969 | Nelson ................................. | 74/866 |
| 3,572,168 | 3/1971 | Shirai et al. ......................... | 74/752 A |

*Primary Examiner*—Arthur I. McKeon
*Attorney, Agent, or Firm*—Depaoli & O'Brien

[57] ABSTRACT

A control system for an automative automatic power transmission of a motor vehicle in which two shift valves are provided for controlling friction elements to provide a plurality of gear ratios. Each of the shift valves has two principal positions which are combined so as to selectively pass a fluid pressure from a source of fluid pressure to servo mechanisms of friction elements for thereby establishing desired speed ratio.

8 Claims, 11 Drawing Figures

CONTROL SYSTEM FOR AN AUTOMOTIVE AUTOMATIC POWER TRANSMISSION

This invention is a continuation-in-part of application Ser. No. 80,311 filed on Oct. 13, 1970 and now abandoned.

This invention relates to an automotive automatic power transmission, and more particularly to a control system for the automatic power transmission.

An automatic power transmission used in a motor vehicle usually includes planetary gear sets each comprising rotary members and includes a plurality of friction elements, such as friction clutches and brakes, to control the rotary members for thereby providing a plurality of gear ratios. To obtain different speed drive ratios, it is necessary to hold one of the rotary members stationary so that the particular rotary member is prevented rotating in a direction. For this purpose, free wheeling devices, such as one-way brakes, are commonly employed to prevent the rotation of the rotary member in this direction. However, if the drive is reversed, the free wheeling device disengages because of the inherent construction thereof and thus the power train is interrupted transiently. This reverse drive condition takes place during coating and, as a result, braking is not applied on the engine.

In the conventional automatic power transmission, an additional friction element is provided to prevent the reaction element of the planetary gear sets from rotating in the normal direction.

It is an object of the invention to provide a control system for an automotive automatic power transmission, which control system is adapted to automatically effecting an engine braking during coasting without manual operation.

Another object of the invention is to provide a control system for effecting a smooth shifting between the gear ratios.

Still another object of the invention is to provide a control system employing a minimum number of shift valves arranged in a novel manner so as to provide a plurality of gear ratios, thereby reducing the manufacturing cost and size of the transmission.

The present invention will be herein described and shown as applied to an automatic power transmission providing three forward driving speed ratios and a single reverse driving speed ratio and as having a torque converter and two planetary gear sets, by way of example only. It should, however, be understood that the control system of this invention is also applicable to a great variety of automatic power transmissions having a centrifugal or an electromagnetic clutch and one or three or more planetary gear sets giving more than three forward driving speed ratios, without departing from the scope of the invention.

Figure 1:
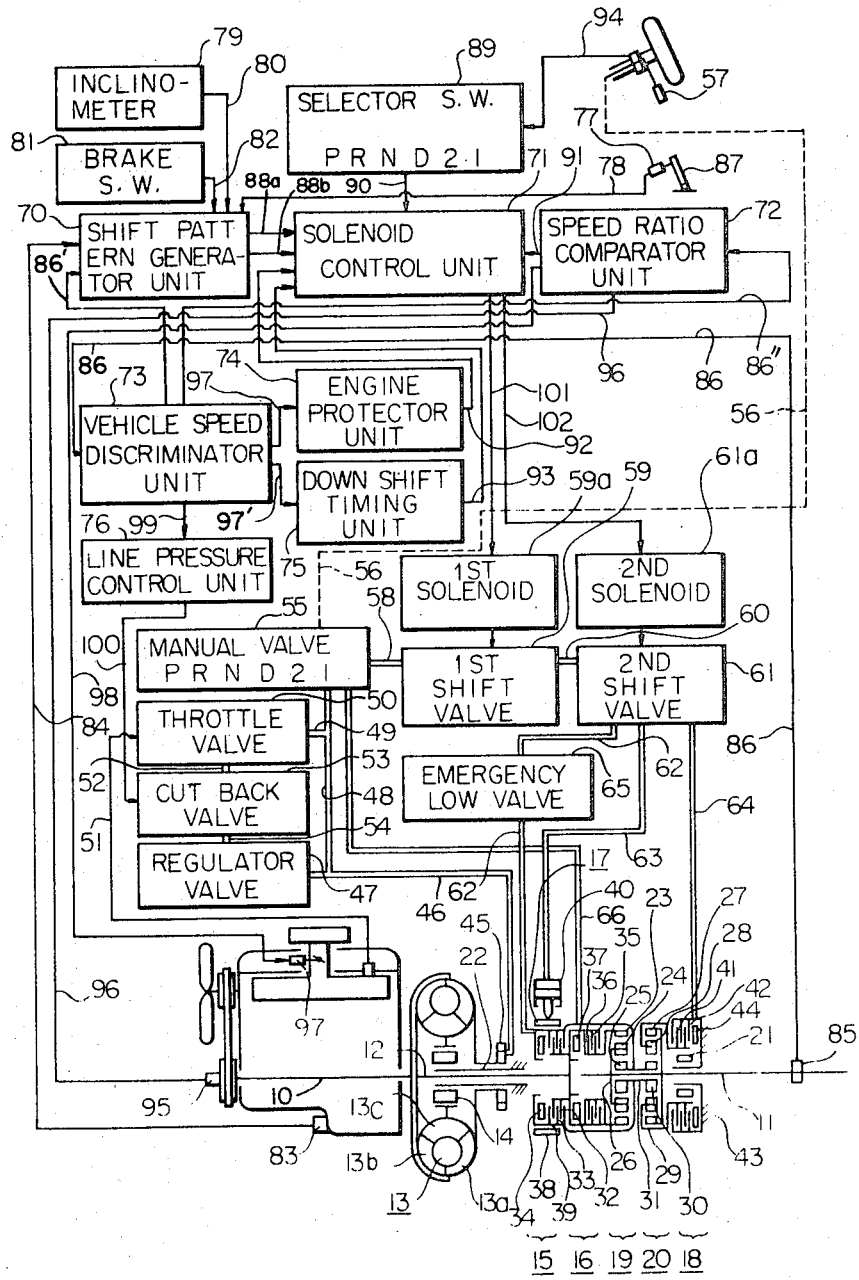
FIG. 1 is a diagrammatic view of a contol system embodying the invention.

Referring now to FIG. 1, the transmission is illustrated to comprise a drive shaft 10 and a driven shaft 11. The drive shaft 10 is connected to and driven by a suitable prime mover such as an internal combustion engine (not numbered), and the driven shaft 11 is connected to the driving wheels (not shown) of the vehicle. The transmission also comprises a turbine shaft 12 which is in line with the shafts 10 and 11. The transmission also comprises a hydraulic torque converter 13 with a one-way brake 14, hydraulically operated friction clutches 15 and 16, hydraulically operated friction brakes 17 and 18, first and second planetary gear sets 19 and 20, and a one-way brake 21.

The hydraulic torque converter 13, comprises, as customary, a bladed impeller or pump 13a, a bladed rotor or turbine 13b, and a bladed reaction element or stator 13c. The impeller 13a is driven from the drive shaft 10, and the rotor 13b is fixed to the turbine shaft 12. The stator 13c is rotatably mounted on a hollow shaft 22, and the one-way brake 14 is mounted between the stator 13c and the hollow shaft 22.

The one-way brake 14 may be of any suitable construction and is so arranged as to allow a free rotation of the stator 13c only in the forward direction of the vehicle, that is, in the direction in which the drive shaft 10 rotates and not in the reverse direction.

The torque converter 13 operates in a manner well known for driving the turbine 13b at an increased torque than the torque impressed on the impeller 13a of the converter. The stator 13c functions to change the direction of flow of fluid from the turbine 13b to the impeller 13a so as to transfer this increased torque to the turbine 13b. The stator tends to rotate in the same direction as the direction in which the turbine and impeller rotate when certain speeds of the last two parts are reached, whereupon the torque converter 13 functions simply as a fluid coupling in which the turbine 13b is driven without increase in torque with respect to the impeller 13a.

The first planetary gear set 19 has rotary members including an outer ring gear 23 which is internally toothed, two or more planet pinions 24 which externally mesh respectivey with the ring gear 23 and a sun gear 25 externally meshing with the planet pinions 24. The planet pinions 24 are carried by a pinion carrier 26. The second planetary gear set 20, similarly, has rotary members including an internally toothed outer ring gear 27, two or more planet pinions 28 externally meshing with the ring gear 27 and carried by a pinion carrier 29, and a sun gear 30 externally meshing with the planet pinions 28. These rotary members (except the pinions) are all rotatable concentrically about a common axis which is in line with the driven shaft 11 connected to the pinion carrier 26. As illustrated by way of example, the sun gears 25 and 30 of the first and second planetary gear sets 19 and 20, respectively, are connected rigidly to each other through a hollow shaft 31. The pinion carrier 26 is rigidly connected to the ring gear 27 of the second planetary gear set 20 through the driven shaft 11.

The friction clutch 15 may be of any suitable construction and in the illustrated arrangement comprises a drive portion 32 connected to the turbine shaft 12, a driven portion 33 connected to the hollow shaft 31 interconnecting the sun gears 25 and 30. The clutch 15 also comprises servo mechanism 34 for engaging and disengaging the drive portion 32 with and from the driven portion 33 when a predetermined hydraulic pressure is applied and relieved, respectively.

The friction clutch 16, similarly, comprises a drive portion 35 connected to the turbine shaft 12 and a driven portion 36 connected to the ring gear 23 of the first planetary gear set 19. The clutch 16 also comprises a servo mechanism 37 for engaging and disengaging the drive portion 35 with and from the driven portion 36.

The brake 17 comprises a brake band 38 adapted to act on a brake drum 39, and functions to brake the sun gears 25 and 30. The brake 17 is actuated by a servo mechanism 40.

The brake 18 comprises a rotating portion 41 connected to the carrier 29 of the planet pinions 28 of the second planetary gear set 20 and a stationary portion 42 connected to a transmission housing 43. The brake 18 is actuated by a servo mechanism 44.

The one-way brake 21 may be of any suitable construction insofar as it functions to allow a free rotation of the rotating portion 41 of the brake 18 in the direction in which the drive shaft 10 rotates but not in the reverse direction.

The transmission provides a low speed forward drive ratio when the manual selector lever is set in the manual first or "1" range position, an intermediate speed forward drive ratio when the manual selector lever is set in the manual second or "2" range position, low, intermediate and high speed drive ratios when the manual selector lever is maintained in the automatic forward drive or "D" range position, and a reverse drive ratio when the manual selector lever is set in the reverse drive position. It is to be noted that in the low speed forward drive ratio in the automatic forward drive or D range position, the power transmission may provide either free-wheeling or engine braking driving condition in response to running conditions of the motor vehicle.

A low speed forward drive ratio is manually or automatically established by engaging the rear clutch 16 and the reverse brake 18 when the manual selector lever is set in either 1 range position or D range position where the motor vehicle is ascending or descending. The turbine torque built up by the torque converter 13 is then distributed through the shaft 12 and the engaged clutch 16 to the ring gear 23 of the first planetary gear set 19. The ring gear 23 causes the planet pinions 24 to rotate in the direction in which the drive shaft 10 rotates. Accordingly, the sun gears 25 and 30 rotate in the direction opposite to the direction of rotation of the shaft 12 so that the planet pinions 28 of the second planetary gear set 20 rotate in the direction in which the drive shaft 10 rotates. In this instance, the low and reverse brake 18 holds the pinion carrier 29 stationary so that the ring gear 27 of the second planetary gear set 20 rotates in the direction of rotation of the drive shaft 10. The ring gear 27 thus rotates in this direction, thereby causing the driven shaft 11, which is connected to the ring gear 27, to rotate in the same direction, whereby the reduced gear ratio for the first forward drive is built up. In the same manner, the low speed forward drive ratio in the D range position where the motor vehicle is running on a level load is established by merely engaging the rear clutch 16 because the one-way brake 21 operates instead of the reverse brake 18.

The intermediate speed power train is established when the second brake 17 is applied as the vehicle speed further increases with the rear clutch 16 kept engaged. A power train is built up linking the turbine shaft 12 to the ring gear 23 through the engaged rear clutch 16. In this instance, however, the second brake 17 operates in a manner to hold the drum 39 stationary and serves as a reaction brake to prevent the rotation of the sun gears 25 and 30. The planet pinions 24, therefore, revolve around the sun gear 25 which is held stationary, and the pinion carrier 26 and accordingly the shaft 11 are driven at a speed lower than the revolution speed of the drive shaft 10. The intermediate speed ratio is thus established when the manual selector lever is maintained in its D or 2 range position.

The high speed power train is established as the vehicle speed further increases when the manual selector valve is maintained in the D range position. The high speed power train is established when the front clutch 15, instead of the second brake 17, is coupled as the vehicle speed further increases with the rear clutch 16 kept engaged. The power delivered from the turbine shaft 12 is transmitted on one hand to the ring gear 23 through the engaged rear clutch 16 and on the other hand to the sun gear 25 through the front clutch 17. Both the sun gear 25 and the ring gear 23 are consequently locked so that all of the associated rotary members rotate at the same speed as the speed of rotation of the drive shaft 10. There is thus established a direct drive between the shafts 12 and 11. The torque converter 13 may function simply as a fluid coupling under this condition and thus there is established a substantially direct drive between the drive shaft 10 and its driven shaft 11.

The reverse drive is completed by engaging the low and reverse brake 18 with the front clutch 15 kept engaged. The turbine torque built up by the torque converter 13 is then distributed through the shaft 12 and engaged clutch 15 to the sun gears 25 and 30. In this instance, the pinion carrier 29 is held stationary by the low and reverse brake 18, so that the ring gear 27 of the second planetary gear set 20 rotates in a direction opposite to the sun gear 30. Thus, the driven shaft 11 is driven at a reduced speed in the reverse direction with respect to the drive shaft 10.

The friction clutches and brakes thus arranged are operated by a hydraulic control system shown in a block form in FIG. 1. The hydraulic control system includes an oil pump 45 which supplies a fluid under pressure to a fluid pressure conduit 46. The fluid pressure conduit 46 communicates with a line pressure regulator valve 47. The line pressure regulator valve 47 communicates with a line pressure conduit 48 and operates in a manner well known to regulate the fluid pressure in the line pressure conduit 48. The line pressure conduit 48 communicates with a conduit 49 which in turn communicates with a throttle valve 50. The throttle valve 50 is operatively connected through a line 51 to an intake manifold of the engine and functions to modulate the fluid pressure in accordance with the variation in the intake manifold vacuum of the engine. This modulated fluid pressure is then passed through a conduit 52 to a cutback valve 53. The cutback valve 53 is adapted to effect a cutback in the fluid pressure supplied from the throttle valve 50 for thereby further modulating the fluid pressure in a manner to be discussed in detail. The fluid pressure thus modulated is delivered through a conduit 54 to the regulator valve 47 where it is utilized for regulating the line pressure in the line pressure conduit 48 to an optimum level to provide a torque appropriate for the friction clutches and brakes. The line pressure in the line pressure conduit 48 is supplied to a manual valve 55.

The manual valve 55 is linked through a mechanical linkage 56 with a manual selector lever 57. The linkage 56 is shown by a broken line in FIG. 1. The manual valve 55 has the following positions: "P" or parking position, "R" or reverse position, "N" or neutral position, D or automatic forward drive position, 2 or manual second speed position, and 1 or manual first speed position. The manual selector lever 57 controls the manual valve 55 for conditioning the transmission in the desired speed range ratio. In this instance, the line pressure delivered to the manual valve 55 is then supplied through a conduit 58 to a first shift valve 59 and through a conduit 60 to a second shift valve 61. The first and second shift valves 59 and 61 cooperate with each other in a manner to be discussed in detail and supply the line pressure to the friction clutch 15, second brake 17 and low and reverse brake 18 through conduits 62, 63 and 64, respectively. Provided between the second shift valve 61 and the front clutch 15 is an emergency low valve 65 which prevents an upshifting from the speed ratio corresponding to the low vehicle speed range to the speed ratio corresponding to the high vehicle speed range when the electronic control system fails and the transmission is set in the manual 1 speed ratio. The line pressure delivered to the manual selector valve 55 is also directly passed to the rear clutch through a conduit 66 when the manual selector valve is set in its D, 2 or 1 range position.

It is an important feature of this invention that the first and second shift valves 59 and 61 have two principal positions, respectively, which are combined with operating positions of first and second valve solenoids 59a and 61a so as to provide a plurality of gear ratios, as shown in Table I. Another important feature of this invention is to effect engine braking while descending when the selector lever 57 is in the D range. An inclinometer 79 is arranged to generate a signal to cause downshifting to $D_2$ and even to $D_1$. In this case $D_1$ is equal to 1 in that the inclinometer signal causes the solenoid 59a to be energized to engage the low and reverse brake 18 instead of the one-way brake 21 thus providing effective engine braking when descending a steep hill.

In Table I, "+" denotes that the solenoids and shift valves coacting therewith are energized to effect any given range and "−" denotes that the solenoids and shift valves coacting therewith are de-energized.

TABLE I

| | 1st Solenoid 1st Shift Valve | 2nd Solenoid 2nd Shift Valve |
|---|---|---|
| P | − | − |
| R | − | − |
| N | − | − |
| D | | |
| 1 (Free-Wheeling) | + | + |
| 1 (Engine-Braking) | + | − |
| 2 | − | + |
| 3 | − | − |
| 2 | − | + |
| 1 | + | − |

As shown in FIG. 1, the electronic control circuit largely comprises a shift pattern generator unit 70, a solenoid control unit 71, a speed ratio comparator unit 72, a vehicle speed discriminator unit 73, an engine protector unit 74, a down-shift timing unit 75 and a line pressure control unit 76. The shift pattern generator unit 70 is electrically connected to a variable resistor or potentiometer 77 through a line 78, to the inclinometer 79 through a line 80, to a brake switch 81 through a line 82, to an engine thermometer device 83 through a line 84, and to a first tachometric generator 85 through a vehicle speed discriminator unit 73 via a line 86. The potentiometer 77 is interlinked with an accelerator pedal 87 so as to detect the position thereof for thereby generating a positive voltage signal corresponding to the detected position which approximately corresponds to the open area of a throttle valve of the engine. The potentiometer 77 also serves to generate a kick-down signal when the accelerator pedal 87 is fully depressed. An example of the potentiometer is clearly disclosed in U.S. Pat. No. 3,439,564 entitled TRANSMISSION GEAR CHANGE CONTROL ARRANGEMENT, PARTICULARLY FOR MOTOR VEHICLE. The inclinometer 79 detects an inclination of the vehicle when the vehicle runs on an ascent or descent and generates a positive voltage signal when the inclination of the vehicle is below a predetermined value. The brake switch 81 is adapted to generate a positive voltage signal only when a brake pedal, not shown, is depressed. The engine thermometer device 83 detects the temperature at which the engine operates and generates a positive voltage signal corresponding to the detected temperature. The first tachometric generator 85 detects the revolution speed of the driven shaft 11 and generates a negative voltage signal corresponding to the detected speed. Each of thus generated voltage signals is applied to the shift pattern generator unit 70 through the lines 78, 80, 82, 84 and 86', respectively. The shift pattern generator unit 70 is adapted to produce a shift pattern for the preferred gear ratio in accordance with the driving conditions of the vehicle for generating voltage signals. The voltage signals are supplied through a lines 88a and 88b to the solenoid control unit 71.

Figure 6:
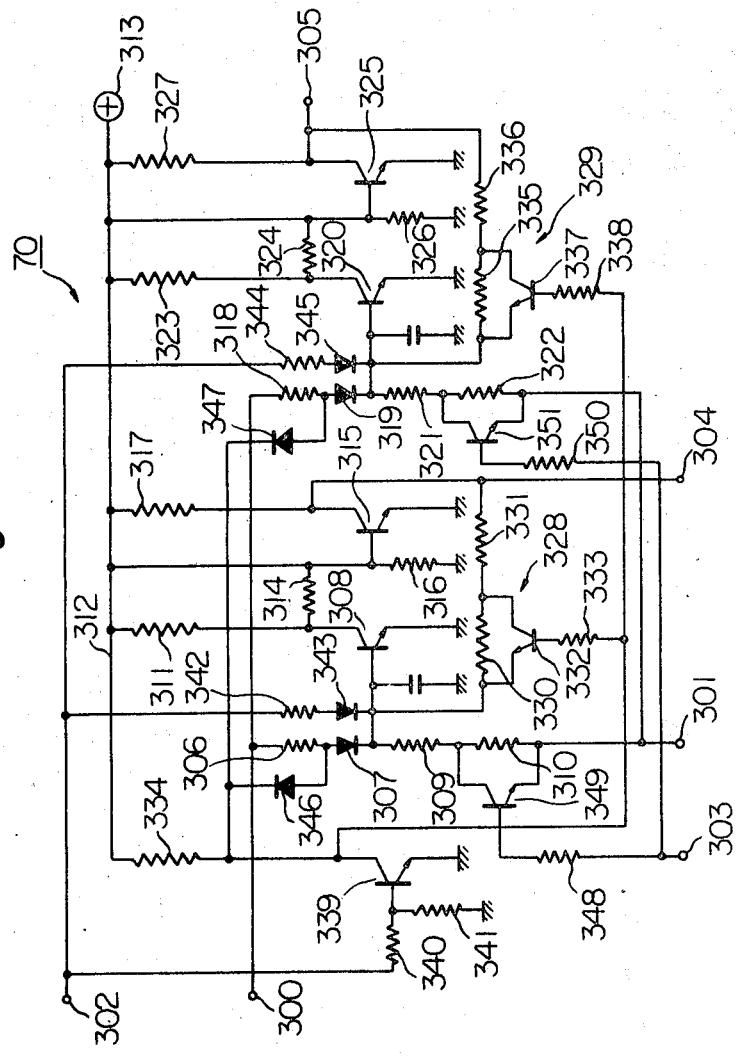
FIG. 6 is a circuit diagram illustrating an example of the shift pattern generator unit shown in FIG. 1.

A preferred example of the shift pattern generator unit 70 is illustrated in FIG. 6. The shift pattern generator unit 70 shown in FIG. 6 has a plurality of input terminals 300, 301, 302 and 303 and first and second output terminals 304 and 305 which are electrically connected through the lines 88a and 88b to the solenoid control unit 71. The input terminal 300 is electrically connected through the line 78 to the potentiometer 77 to receive a positive voltage signal indicative of the throttle opening. The input terminal 301 is electrically connected to the tachometric generator 85 through the vehicle speed discriminator unit 73 to receive a negative voltage signal indicative of the vehicle speed. The input terminal 302 is electrically connected to the potentiometer 77 to receive a kick-down signal generated therefrom. The input terminal 303 is electrically connected to the inclinometer 79 to receive a positive voltage signal generated therefrom. The input terminal 300 is electrically connected through a resistor 306 and a diode 307 to the base of a first transistor 308, to which the input terminal 301 is also connected through resistors 309 and 310. Thus, the base of the first transistor 308 is supplied with the positive voltage signal representative of the position of the accelerator pedal 87 and the negative voltage signal representative of the rotational speed of the driven shaft 11 of the power transmission, so that, when the sum of these voltage signals exceeds a predetermined value, the first transistor 308 is rendered conductive. The first transistor 308 has its collector connected through a resistor 311 to a bus line 312, which is connected to a constant voltage supply source 313, and has its emitter grounded. The collector of the first transistor 308 is connected through a resistor 314 to the base of a second transistor 315, which base is also connected to the bus line 312. As shown, the base of the transistor 315 is also grounded through a resistor 316. The second transistor 315 has its collector connected through a resistor 317 to the bus line 312 and its emitter grounded. The collector of the second transistor 315 is also connected to the output terminal 304 on which a first output voltage signal appears when the second transistor 315 is non-conductive. As shown, the input terminal 300 is also connected through a resistor 318 and a diode 319 to the base of a third transistor 320, to which the input terminal 301 is also connected through resistors 321 and 322 in a manner as prescribed. Thus, the base of the third transistor 320 receives the positive voltage signal transmitted from the potentiometer 77 and the negative voltage signal transmitted from the tachometric generator 85 through the vehicle speed discriminator unit 73 so that, when the sum of these voltage signals exceeds a predetermined value, the third transistor 320 is conductive. The third transistor 320 has its collector connected through a resistor 323 to the bus line 312 and its emitter grounded. The collector of the third transistor 320 is also connected through a resistor 324 to the base of a fourth transistor 325. The base of the fourth transistor 325 is also connected through a resistor 326 to the ground. The fourth transistor 325 has its collector connected through a resistor 327 to the bus line 312 and its emitter grounded. The collector of the fourth transistor 325 is also connected to the output terminal 305 on which a second output voltage signal appears when the fourth transistor 325 is non-conductive. The shift pattern generator unit 70 shown in FIG. 6 also includes a first feed-back circuit 328 which is electrically connected between the collector of the second transistor 315 and the base of the first transistor 308 and a second feed-back circuit 329 which is electrically connected between the collector of the fourth transistor 325 and the base of the third transistor 320. The first feed-back circuit 328 includes resistors 330 and 331 and a transistor 332 having its collector connected to one end of the resistor 330 and its emitter connected to the other end of the resistor 330. The base of the transistor 332 is connected through resistors 333 and 334 to the bus line 312, so that the transistor 332 is normally conductive to pass the first voltage signal through the resistor 331 to the base of the first transistor 308. Similarly, the second feedback circuit 329 includes resistors 335 and 336 and a transistor 337 having its collector connected to one end of the resistor 335 and its emitter connected to the other end of the resistor 335. The base of the transistor 337 is connected through a resistor 338 to the resistor 334 which in turn is connected to the bus line 312, so that the transistor 337 is normally conductive to pass the second output voltage signal through the resistor 336 to the base of the transistor 320. The operations of the transistors 332 and 337 are controlled by a fifth transistor 339. To this end, the transistor 332 is connected at its base to the collector of the fifth transistor 339, to which the base of the transistor 337 is also connected. The base of the fifth transistor 339 is connected through a resistor 340 to the input terminal 302 to which a kickdown signal is supplied only when the accelerator pedal 87 is sharply depressed. The base of the transistor 339 is also connected through a resistor 341 to the ground. The emitter of the fifth transistor 339 is grounded. The input terminal 302 is also connected through a resistor 342 and a diode 343 to the base of the first transistor 308 and connected through a resistor 344 and a diode 345 to the base of the third transistor 320. Thus, the kick down signal is applied to the base of the first transistor 308 and to the base of the third transistor 320. Connected to the junction between the resistor 306 and the diode 307 is a diode 346 which is connected through the resistor 334 to the bus line 312. A diode 347 is connected between the resistor 334 and the junction between the resistor 318 and the diode 319. The input 303 is connected through a resistor 348 to a sixth transistor 349 which is connected in parallel to the resistor 310 and connected through a resistor 350 to a seventh transistor 351 which is connected in parallel to the resistor 322 for varying the value of the voltage signal indicative of the rotational speed of the driven shaft of the power transmission to be supplied to the base of the first transistor 308 and to the base of the third transistor 320, respectively.

When, in operation, the base of the first transistor 308 is supplied with the positive voltage signal, delivered from the input terminal 300 through the resistor 342 and the diode 343, and the negative voltage signal, delivered from the input terminal 301 through the resistors 309 and 310. At same time, the base of the third transistor 320 is supplied with the positive voltage signal, delivered from the input terminal 300 through the resistor 318 and the diode 319, and the negative voltage signal, delivered from the input terminal 301 through the resistors 321 and 322. If, in this instance, the sum of these voltage signals exceed a predetermined value, then the first and third transistors 308 and 320 are conductive. In this condition, there is no voltage to be supplied to the base of the transistor 315 so that the second transistor 315 is made non-conductive and, therefore, a first output voltage is present at the collector thereof and accordingly at the output terminal 304. Likewise, there is no voltage to be supplied to the base of the fourth transistor 325 so that it is made non-conductive and, therefore, a second output voltage signal appears at the collector thereof and accordingly at the output terminal 305. Thus, when the power transmission is operating at a first speed drive ratio, the first and second output voltage signals appear at the outputs 304 and 305, respectively.

As the vehicle speed increases, the sum of the voltage signals appearing at the base of the first transistor decreases below the predetermined value because the negative voltage increases so that the first transistor 308 is made non-conductive, thereby rendering the second transistor 315 to become conductive. Consequently, the first output voltage signal is absent at the output terminal 304. Since, in contrast, the resistance values of the resistors 318 and 321 are so determined as to cause the third transistor 320 to become conductive when the power transmission is operating at the second speed drive ratio, the fourth transistor 325 is non-conductive so that the second output voltage is present at the output 305.

As the vehicle speed further increases, the third transistor 320 is made non-conductive thereby causing the fourth transistor 325 to become conductive so that the second output voltage signal does not appear at the output 305. Thus, when the power transmission is operating at its high speed drive ratio, the first and second output voltage signals do not appear at the first and second output terminals 304 and 305, respectively.

If a kick-down signal is present at the input terminal 302, then the fifth transistor 339 is made conductive. Since, in this instance, the collector of the fifth transistor 339 is connected through the diodes 346 and 307 to the base of the first transistor 308, the voltage signal delivered from the input terminal 300 is passed through the diode 346 to the collector of the fifth transistor 339, through which the voltage signal is passed to the ground. Consequently, the base of the first transistor 308 is supplied with the kick-down signal delivered through the resistor 342 and the diode 343 from the input 302. In the same manner, the base of the third transistor 320 is supplied with the kick-down signal delivered through the resistor 344 and the diode 345 from the input terminal 302. Since, moreover, the transistors 332 and 337 of the first and second feed-back circuits 328 and 329 are connected to the collector of the fifth transistor 339, the transistors 332 and 337 are made non-conductive. Accordingly, the first output voltage appearing at the collector of the transistor 315 is fed back through the resistors 330 and 331 to the base of the transistor 308, whereas the second output voltage appearing at the collector of the transistor 325 is fed back through the resistors 335 and 336 to the base of the transistor 320.

If, furthermore, the motor vehicle is running on a road slanting at a certain angle which is below a predetermined value, then a voltage signal is supplied to the input terminal 303 from the inclinometer 79. This voltage signal is then supplied to the base of the transistor 349 and the base of the transistor 351 so that these transistors are rendered conductive. Under these conditions, the voltage signal appearing at the input terminal 301 is supplied through the resistor 309 to the base of the transistor 308 and through the resistor 321 to base of the transistor 320. If, in contrast, the inclination of the motor vehicle exceeds a predetermined value, then the voltage signal is not produced by the inclinometer 79 so that the transistors 349 and 351 are rendered non-conductive. Under these conditions, the voltage signals to be supplied to the base of the transistor 308 and the base of the transistor 320 depend on the resistance values of the resistors 309 and 310 and the resistance values of the resistors 321 and 322, respectively. Thus, the voltage signal to be supplied to each of the transistors 308 and 320 when the voltage signal is present at the input terminal 303 is lower than that supplied thereto when the voltage signal is absent at the input terminal 303 and, therefore, the shifting point is raised to a higher vehicle speed when the inclination of the motor vehicle is above the predetermined value.

Figure 7:
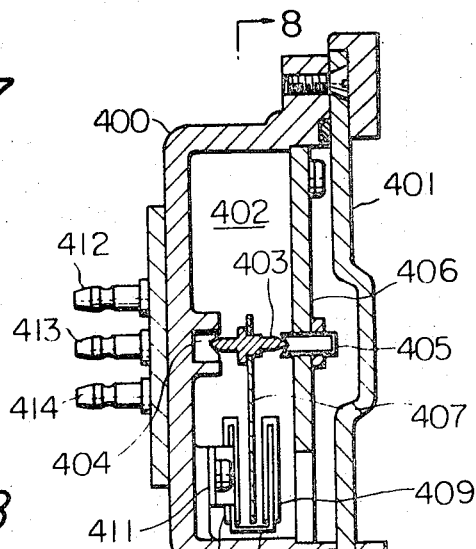
FIG. 7 is a cross-sectional view illustrating a mechanical part of the inclinometer shown in FIG. 1.
Figure 8:
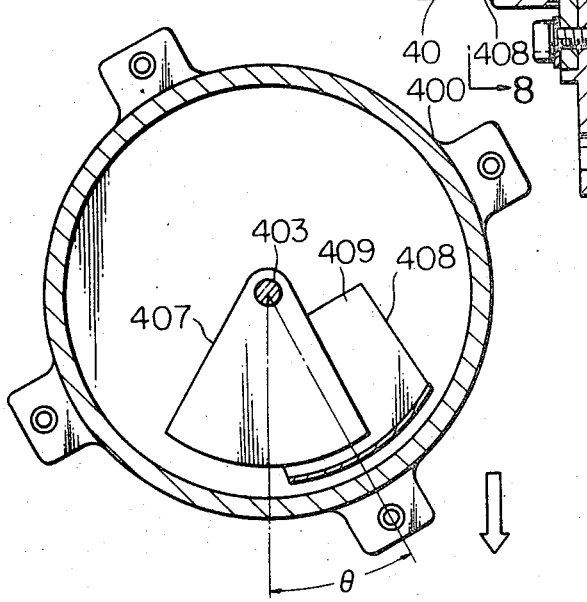
FIG. 8 is a section taken on line 8—8 of FIG. 7.
Figure 9:
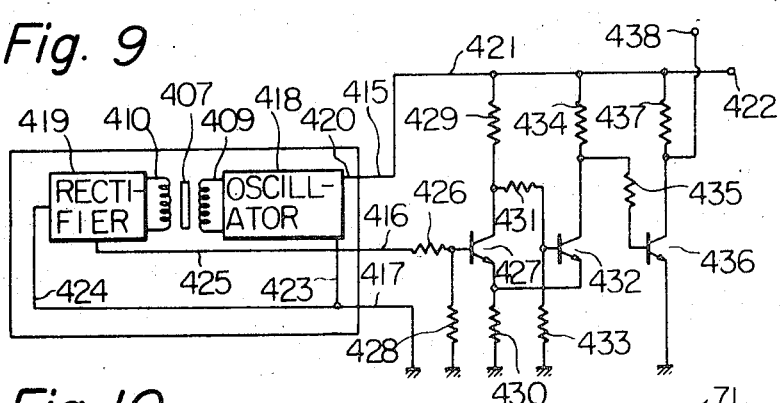
FIG. 9 is a view showing an electric part of the inclinometer shown in FIGS. 7 and 8.

A preferred example of the inclinometer 79 is illustrated in FIGS. 7, 8 and 9. As seen from FIGS. 7 and 8, the inclinometer 79 includes a casing 400 which is closed by an end plate 401 to form a cavity 402 therebetween. Provided in the cavity 402 is a pivoted axis 403 which is rotatably supported at its both ends by a pair of supporting members 404 and 405 made of wear resisting material. The supporting member 404 is mounted on the bottom portion of the casing 400, whereas the supporting member 405 is mounted on a circular plate 406 disposed within the cavity 402. A sector metal plate 407 serving as a weight is fixed to the pivoted axis 403 and is rotatable therewith. A U-shaped insulating plate 408 is located in the cavity 402 and has two flange portions provided with printed coils 409 and 410, respectively, between which the sector weight 407 is movably interposed. The U-shaped insulating plate 408 is secured to the casing 400 by means of a bracket 411 in a member as shown in FIG. 7. The inclinometer 79 also has three terminals 412, 413 and 414 which are mounted on the casing 400 and which are electrically connected to lines 415, 416 and 417, respectively, of an electric circuit shown in FIG. 9. As best seen from FIG. 9, the inclinometer 79 further includes an oscillator 418 and a rectifier 419 which are electrically connected to the printed coils 409 and 410, respectively. The oscillator 418 has two terminals, one terminal being connected through a line 420 to the line 415 which in turn is connected to a bus line 421 connected to a source of voltage supply 422, and the other terminal being connected through a line 423 to the line 417 which is directly grounded. The rectifier 419 has two terminals, one terminal being connected through a line 424 to the line 417 which is grounded, and the other terminal being connected through a line 425 to the line 416. The line 416 is connected through a resistor 426 to the base of a transistor 427. The base of the transistor 427 is also connected through a resistor 428 to the ground. The transistor 427 has its collector connected through a resistor 429 to the bus line 421 and its emitter grounded through a resistor 430. The collector of the transistor 427 is also connected through a resistor 431 to the base of a transistor 432, which is also grounded through a resistor 433. The transistors 427 and 432 and the resistors 430, 431 and 433 form a Schmidt circuit which operates in a manner as will be described hereinafter. The transistor 432 has its collector connected through a resistor 434 to the bus line 421 and its emitter connected to the emitter of the transistor 427. The collector of the transistor 432 is also connected through a resistor 435 to the base of a transistor 436 having its collector connected through a resistor 437 to the bus line 421 and its emitter connected to the ground. The collector of the transistor 436 is also connected to an output 438 on which an output signal appears. With this arrangement, the sector weight 407 is moved in varying degrees in dependence on the inclination of the inclinometer 47 so that the mutual inductance between the coils 409 and 410 is varied thereby to vary the level of the electric current rectified by the rectifier 419 and, thus, the voltage varying in accordance with the degree of inclination of the inclinometer 79 is applied to the base of the transistor 427. If, in this instance the base potential of the transistor 427 exceeds a predetermined value, then the transistor 427 is rendered conductive. With the transistor 427 conducting, there is no voltage to be supplied to the base of the transistor 432 so that the transistor 432 is rendered non-conductive, thereby causing the transistor 436 to become conductive. Under this condition, there is no output signal appearing at the output terminal 438. On the contrary, if the base potential of the transistor 427 decreases below the predetermined value, then the transistor 427 is rendered non-conductive, thereby rendering the transistor 432 conductive so that the transistor 436 is caused to non-conductive and, therefore, an output signal appears at the output terminal 438. It should be noted that the output terminal 438 is connected to the input terminal 303 of the shift pattern generator unit 70.

The solenoid control unit 71 is connected to a selector switch 89 through a line 90, to the speed ratio comparator unit 72 through a line 91, to the engine protector unit 74 through a line 92, and to the down shift timing unit 75 through a line 93. The selector switch 89 is connected to the selector lever 57 through a link 94 and generates a voltage signal indicative of the selected speed range, which signal is supplied to the solenoid control unit 71 through the line 90.

Figure 10:
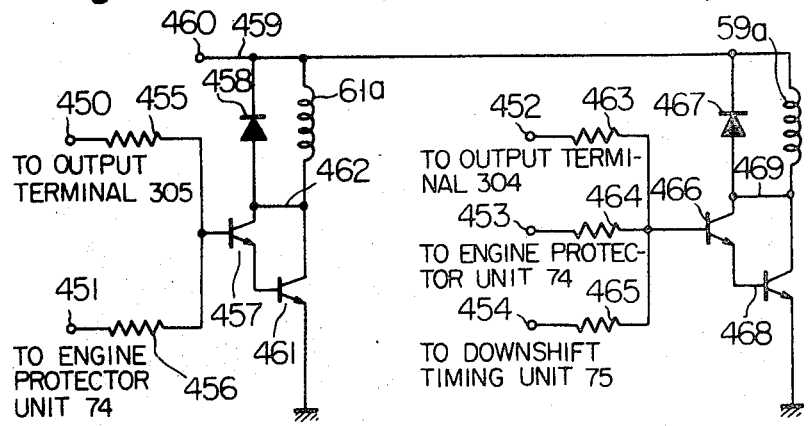
FIG. 10 is a circuit diagram showing an example of the solenoid control unit shown in FIG. 1.

A preferred example of the solenoid control unit 71 is illustrated in FIG. 10.

In FIG. 10, the solenoid control unit 71 has a plurality of input terminals 450, 451, 452, 453 and 454. The input terminal 450 is connected to the second output terminal 305 of the shift pattern generator 70, the input terminal 451 is connected through the line 92 to the engine protector unit 74 for receiving a voltage signal when the selector switch 89 is moved to its manual 2 position, the input terminal 452 is connected to the first output terminal 304 of the shift pattern generator unit 70, the input terminal 453 is connected through the line 92 to the engine protector unit 74 for receiving a voltage signal when the selector switch 89 is moved to its manual 1 position, and the input terminal 454 connected through the line 93 to the downshift timing unit 75. The input terminals 450 and 451 are connected in parallel to the base of a transistor 457 through resistors 455 and 456, respectively. The transistor 457 has its collector connected through a diode 458 to a bus line 459 connected to a source 460 of voltage supply and its emitter connected to the base of a transistor 461 having its collector connected to the second solenoid 61a which is connected to the bus line 459 and its emitter grounded. The collector of the transistor 461 is also connected through a line 462 to the collector of the transistor 457. The input terminals 452, 453 and 454 are connected to resistors 463, 464 and 465, respectively, which in turn are connected in parallel to the base of a transistor 466. The collector of the transistor 466 is connected through a diode 467 to the bus line 459 and the emitter thereof is connected to the base of a transistor 468. The collector of the transistor 468 is connected to one terminal of the first solenoid 59a which is connected to the bus line 459 at its other terminal and the emitter thereof is grounded. The collector of the transistor 468 is also connected through a line 469 to the collector of the transistor 466.

With this arrangement, if the automatic power transmission is operating in its first speed gear ratio when the manual selector level 57 is maintained in its D position, then the shift pattern generator unit 70 produces first and second voltage signals at the output terminals 304 and 305 in a manner as previously described. The first voltage signal thus produced is transmitted to the input terminal 452 of the solenoid control unit 71. This voltage signal is then supplied through the resistor 463 to the base of the transistor 466 so that it is rendered conductive. With the transistor 466 conducting, the transistor 468 is rendered conductive and, therefore, the first solenoid 59a is energized. At the same time, the second voltage signal appearing at the output terminal 305 of the shift pattern generator unit 70 is transmitted to the input terminal 450 of the solenoid control unit 71. This voltage signal is then supplied through the resistor 455 to the base of the transistor 457, thereby causing the same to become conductive. With the transistor 457 conducting, the transistor 461 is made conductive so that the second solenoid 61a is energized.

As the vehicle speed increases, only a second voltage signal appears at the second output terminal 305, from which the second voltage signal is delivered to the base of the transistor 457 through the resistor 455, and, accordingly, the second solenoid 61a is energized in a manner as prescribed hereinabove. In this instance, there is not a voltage signal to be delivered to the base of the transistor 466 so that the same is rendered non-conductive, thereby rendering the transistor 468 non-conductive and, therefore, the first solenoid 59a is de-energized.

As the vehicle speed further increases, the first and second voltage signals disappear at the output terminals 304 and 305 of the shift pattern generator unit 70 so that any voltage signal is not supplied to the bases of the transistors 457 and 466 and, thus, the first and second solenoids 59a and 61a, respectively, are de-energized. If in this instance, the manual selector lever 57 is moved to its manual 1 position, then the engine protector unit 74 produces a voltage signal which is supplied to the input terminal 453 of the solenoid control unit 71. This voltage signal is delivered through the resistor 464 to the base of the transistor 466 so that it is rendered conductive, thereby causing the transistor 468 to become conductive and, thus, the first solenoid 59a is energized. If, moreover, the manual selector lever 57 is moved to its manual 2 position, then the engine protector unit 74 produces a voltage signal to be delivered to the input terminal 451 of the solenoid control unit 71. The voltage signal delivered to the input terminal 451 is transmitted through the resistor 456 to the base of the transistor 457 so that it is rendered conductive. Upon conducting of the transistor 457, the transistor 461 is made conductive and, therefore, the second solenoid 61a is energized. The engine protector unit is, for example, clearly shown and described in co-pending U.S. Patent application Ser. No. 80,309, now Pat. No. 3,721,136 filed Oct. 13, 1970, entitled ELECTRONIC CONTROL DEVICE FOR AUTOMATIC POWER TRANSMISSION and, therefor, the detail description of the same is herein omitted for the sake of simplicity of illustration.

The speed ratio comparator unit 72 is connected to the first tachometer 85 through the vehicle speed discriminator unit 73 to receive the voltage signal proportional to the vehicle speed, and is also connected via a line 96 to a second tachometric generator 95 sensing engine speed and generating a signal proportional to it. When downshifting from the third speed drive ratio to the second speed drive ratio is required, the comparator unit 72 compares the values of the signals indicative of engine and vehicle speeds. If the comparison shows that the engine speed is not in synchronism with the vehicle speed for the desired downshift, a signal is generated and supplied to a throttle valve control unit 97 via a line 98 to increase the engine speed by increasing the degree of opening of the throttle valve. When synchronising has been completed to suit the new speed ratio during gear shift, the comparator unit 72 generates a signal to reset the throttle valve and generates at the same time another signal supplied via line 91 to the solenoid control unit 71 indicative of synchronising being completed. The solenoid control unit 71 generates then a speed ratio change command signal energizing the solenoid 61a to set the transmission in the second speed ratio. The speed ratio comparator unit 72 may be of the type which is disclosed in a U.S. Pat. No. 3,446,097 entitled DEVICE FOR SYNCHRONIZED SHIFTING OF MOTOR VEHICLE TRANSMISSIONS or in a U.S. Pat. No. 3,417,640 entitled ELECTRIC CONTROL MEANS FOR SYNCHRONIZED GEAR SHIFTING IN MOTOR VEHICLE SPEED GEAR BOXES.

Figure 11:
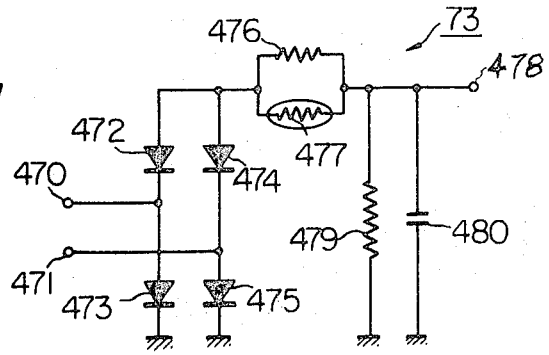
FIG. 11 is a circuit diagram showing an example of the vehicle speed discriminator unit shown in FIG. 1.

The engine protector unit 74 is connected through a line 97 to the vehicle speed discriminator unit 73. An example of the vehicle speed discriminator unit 73 is illustrated in FIG. 11. In FIG. 11, the vehicle speed discriminator unit 73 has two input terminals 470 and 471 which are connected to the tachometric generator 85 to receive an a.c. voltage therefrom. The input terminal 470 is connected between diodes 472 and 473, while the input terminal 471 is connected between diodes 474 and 475. The diode 472 is connected through the resistor 476 and temperature compensating thermistor 477, which are connected in parallel, to an output terminal 478, which is connected through the lines 97 and 98 to the engine protector unit 74 and downshift timing unit 75, respectively, and the diode 473 is grounded. The diode 474 is connected through the resistor 476 and thermistor 477, which are connected in parallel, to the output terminal 478 and the diode 475 is grounded. A resistor 479 and a capacitor 480 are connected in parallel to the output terminal 478. The resistors 476 and 479 and the capacitor 480 serve as a filter circuit. With this arrangement, the a.c. voltage delivered to the input terminals 470 and 471 are converted into a d.c. voltage by means of the diodes 472 and 473 and the diodes 474 and 475, respectively, which d.c. voltage is delivered to the output terminal 478. The vehicle speed discriminator unit 73 is connected through the line 86 to the first tachometric generator unit 85 and generates a voltage signal corresponding to the revolution speed of the driven shaft 11. The voltage signal is supplied to the engine protector unit 74 which produces a signal indicative of the gear ratio desired to prevent excessive engine speed. This signal is then supplied through the line 92 to the solenoid control unit 71. The voltage signal corresponding to the vehicle speed is also supplied to the downshift timing unit 75 through a line 98. The downshift timing unit 75 functions to effect a smooth downshift by setting the transmission into a neutral condition until the engine speed reaches a synchronized speed. This neutral condition will be referred to as a neutral interval hereinafter. The neutral interval must be arranged to be longer for a higher vehicle speed. The downshift timing unit 75 generates a pulse having a width corresponding to the neutral interval, which pulse is then supplied through the line 93 to the solenoid control unit 71. Thus, the solenoid control unit 71 functions to maintain the transmission in the neutral condition for the duration of the pulse for thereby effecting a smooth downshift of the gear ratios. The downshift timing unit 75 is, for example, clearly shown and described in copending U.S. Patent application Ser. No. 76,458 now Pat. No. 3,703,109 filed on Sept. 29, 1970, entitled ELECTRONIC CONTROL DEVICE FOR AUTOMATIC POWER TRANSMISSION MECHANISM and, therefor, the detail description of the same is herein omitted for the sake of simplicity of illustration.

The line pressure control unit 76 is connected to the vehicle speed discriminator unit 73 through a line 99 and generates a signal corresponding to the vehicle speed signal delivered from the vehicle speed discriminator unit 73. The signal delivered from the line pressure control unit 76 is then supplied through a line 100 to the cutback valve 53 whereby a cutback is effected in the line pressure which is consequently reduced. The detailed construction of the line pressure control unit 76 is clearly shown and described in a copending application Ser. No. 80,310 now Pat. No. 3,695,122 filed Oct. 13, 1970 and titled A CONTROL SYSTEM FOR AN AUTOMOTIVE AUTOMATIC POWER TRANSMISSION by the same applicant and, therefore, the detailed description of the same is herein omitted.

Figure 2:
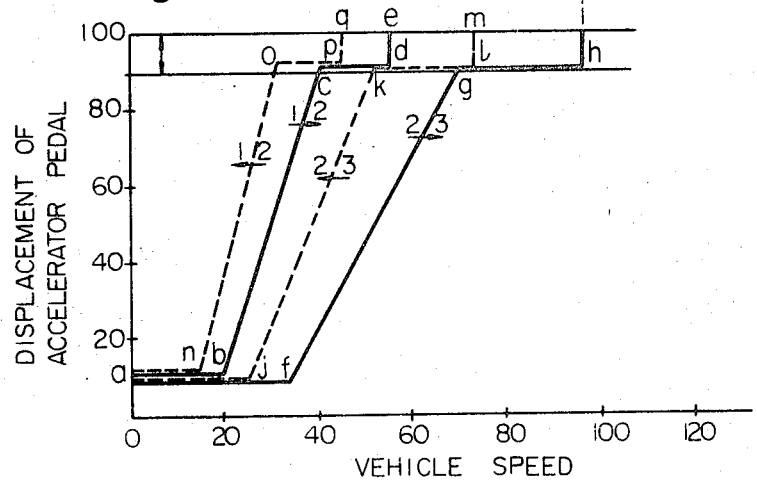
FIGS. 2 and 3 are examples of preferred shift patterns attainable with the automatic power transmission shown in FIG. 1.
Figure 3:
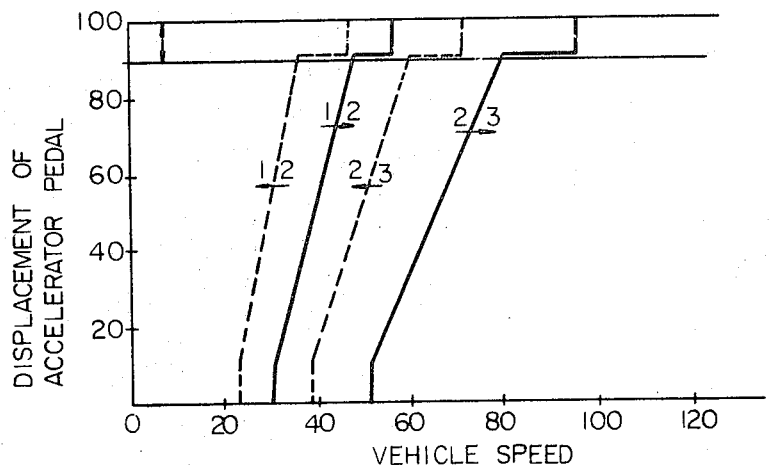

Preferred examples of the shift patterns which are available with use of the shift pattern generator unit 70 are illustrated in FIGS. 2 and 3. FIG. 2 represents the shift pattern attained when the vehicle is driven on a level road and FIG. 3 indicates the shift pattern which is attained when the vehicle is driven on an ascent or descent. In FIG. 2, the curve a-b-c-d-e indicates the shifting point at which a low speed drive ratio is shifted to intermediate and the curve a-f-g-h-i indicates the shifting point at which the intermediate speed drive ratio is shifted to high, while the curve a-j-k-l-m indicates the shifting point at which the high speed drive ratio is shifted to intermediate and the curve a-n-o-p-q indicates the shifting point at which the intermediate speed drive ratio is shifted to low. When the vehicle runs on the level road, the shift pattern generator unit 70 generates the shifting signals for the low, intermediate and high speed drive ratios in accordance with the shift patterns shown in FIG. 2.

FIG. 3 illustrates how the shift pattern is varied so as to raise the shifting point to a higher vehicle speed when the vehicle runs on an ascent, when a brake is applied to the engine while the vehicle is running on a descent, and when the engine is operating at a low temperature. For example, when the vehicle is driven on a road slanting at a certain angle, the shift pattern generator unit 70 generates the shifting signal which is in agreement with the shift pattern of FIG. 3. The shift pattern may be changed by the signal delivered from the engine thermometer device 83 in the same manner as discussed hereinabove. Furthermore, the shift pattern may be so prescribed as to vary when the brake pedal is depressed. Thus, the shift pattern generator unit 70 produces the shifting signals for the low, intermediate and high speed drive ratios in accordance with the driving conditions of the vehicle, which signals are then supplied to the solenoid valve control unit 71. All the signals delivered from the shift pattern generator unit 70, speed ratio comparator unit 72, engine protector unit 74, downshift timing unit 75 and selector switch 89 are supplied to the solenoid valve control unit 71 where they are converted into a suitable electrical signal for controlling the first and second solenoid valves 59a and 61a to effect ratio changes according to the shift pattern shown in FIGS. 2 and 3. The electrical signals are then supplied through lines 101 and 102 to the respective valve solenoids 59a and 61a.

The following Table II shows which friction elements are engaged to complete the power train in each of the forward and reverse drive ratios:

TABLE II

| Selected position | | Speed range | Front clutch 15 | Rear clutch 16 | Second brake 17 | Low and reverse brake 18 | One-way brake 21 |
|---|---|---|---|---|---|---|---|
| Normal operation: | | | | | | | |
| | P | Parking | − | − | − | + | − |
| | R | Reverse | + | − | − | + | − |
| | N | Neutral | − | − | − | + | − |
| | D | 1 (free-wheeling) | − | + | − | − | + |
| | | 1 (engine braking) | − | + | − | E | − |
| | | 2 | − | + | E | − | − |
| | | 3 | E | + | − | − | − |
| | 2 | 2 | − | + | E | − | − |
| | 1 | 1 | − | + | − | E | − |
| Emergency operation: | | | | | | | |
| | P | Parking | − | − | − | + | − |
| | R | Reverse | + | − | − | + | − |
| | N | Neutral | − | − | − | + | − |
| | D | 3 | + | ± | − | − | − |
| | 2 | 3 | + | + | − | − | − |
| | 1 | 1 | − | + | − | − | + |

Note:
E: Engagement is caused automatically by the electronic control system.
+: Engaged
−: Disengaged.

In the Table II, the sign "+" is intended to mean that the related friction element is manually engaged, and the sign "−" to mean that the friction element is released. The letter "E" means that the friction element is caused to be engaged automatically by the electronic control system.

As seen in Table II, when the manual selector valve 55 is moved to P or N position, all the friction elements are disengaged except for the low and reverse brake 18 which is engaged, so that the power transmission is maintained in a neutral condition. The reason for engaging the low and reverse brake 18 in this instance is to effect a smooth shifting when the manual selector valve 55 is moved to R position. As shown in Table I, when the manual selector valve 55 is moved to the P or N position, both the first and second solenoids 59a and 61a are de-energized so that the power transmission can be maintained in the neutral condition even in the event the electronic control circuit fails.

When the manual selector valve 55 is moved to the R position, the line pressure delivered to the manual valve 55 is passed through the first and second shift valves 59 and 61 to servo mechanisms of clutch 15 and brake 18 engaging the respective friction elements, thereby establishing the reverse drive ratio.

In all the forward drive ranges (i.e. D, 2 and 1 ranges), the rear clutch 16 serves as the power input clutch and is therefore directly engaged by the line pressure delivered through the conduit 66 applied to the servo mechanism of the clutch 16 in FIG. 1.

As the accelerator pedal 87 is depressed when the selector lever 57 is set in the D position, the first speed shifting signal is present at the lines 101 and 102, so that the first and second solenoids 59a and 61a are energized as presented in Table I previously set forth. In this instance, the first and second shift valves 59 and 61 cooperate with each other to prevent the line pressure from being supplied to the servo mechanism of the friction elements 15, 17 and 18 as seen in the Table II. The rear clutch 16 is, however, actuated by the line pressure in the conduit 66 and, in addition thereto, the one-way brake 21 is operated so that the forward low speed drive ratio is obtained.

As the vehicle speed increases, the first solenoid valve 59a is de-energized with the second solenoid valve 61a kept energized by the action of the solenoid control unit 71 and coacts, as previously described, so that the 1-2 shift valve 59 causes the engagement of the second brake 17, whereby a second or intermediate speed drive ratio is established.

As the vehicle speed further increases, both of the first and second solenoids 59a and 61a are de-energized as seen in the Table I, with the result that the front clutch 15 is actuated and thus the high speed drive ratio is established.

When the selector lever 57 is set in the 2 range position, the first solenoid 59a is de-energized while the second solenoid 61a is energized by the solenoid control unit 71 so that the second brake 17 is actuated with the rear clutch 16 kept engaged. Thus, the manual second speed drive ratio is obtained.

When the manual selector lever 57 is moved to the 1 range position, the first solenoid 59a is energized while the second solenoid 61a is de-energized, whereby the low and reverse brake 18 is engaged and thus the manual low speed drive ratio is established.

If the selector lever 57 is accidentally shifted to the 1 range position while the vehicle is running at a high speed in the D range, then the electronic control system acts by preventing the first solenoid 59a from being energized and energizing the second solenoid 61a instead to engage the second brake 17 to establish the second speed ratio in the transmission.

Figure 4:
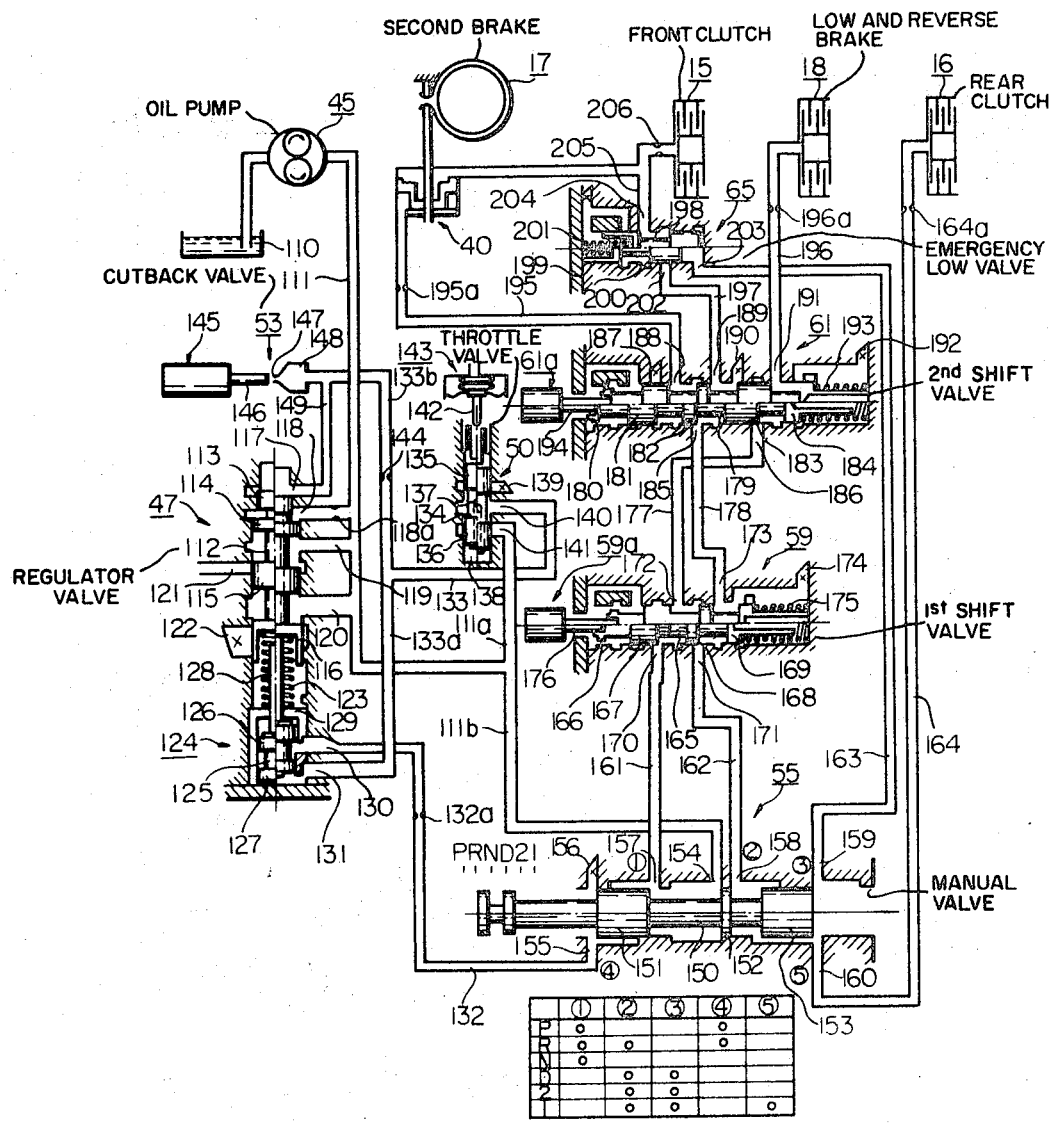
FIG. 4 is a schematic view illustrating a hydraulic control system forming part of the control system shown in FIG. 1.

Referring now to FIG. 4, there is shown in detail the hydraulic control system which is controlled by the electronic control circuit shown in FIG. 1. As shown, the hydraulic control system includes the oil pump 45, line pressure regulator valve 47, throttle valve 50, manual selector valve 55, first shift valve 59 coacting with the first solenoid 59a, second shift valve 61 coacting with the second solenoid 61a, and the emergency low valve 65, all of which have been described and shown.

The oil pump 45, which may be of any suitable construction, supplies a pressurized fluid from a sump 110 to a line pressure conduit 111. The line pressure conduit 111 is connected to the line pressure regulator valve 47.

The line pressure regulator valve 47 includes a slidable valve spool 112 having a plurality of spaced lands 113, 114, 115 and 116 and regulates the fluid pressure in the line pressure conduit 111. The regulator valve 47 has ports 117, 118, 119, 120, 121 and 122. The port 117 communicates with the cutback valve 53. The port 118, which has an orifice 118a therein, communicates with the line pressure conduit 111, with which ports 119 and 120 also communicate. The port 121 communicates with an oil circulation and lubrication circuit (not shown). The port 122 is a drain port through which the excess fluid in the line pressure conduit 111 is drained off to reduce the line pressure. A spring 123 is provided for biasing the valve spool 112 upwardly of the drawing. As shown, the regulator valve 47 is operatively connected to an amplifier piston 124.

The amplifier piston 124 includes a slidable spool 125 having spaced lands 126 and 127. On the spool 125 is mounted a push rod 128 which cooperates with the land 116 of the regulator valve 47 to increase the line pressure in the line pressure conduit 111. The valve spool 125 is slidably disposed in a sleeve 129 which has ports 130 and 131. The port 130 is connected through a conduit 132 having an orifice 132a therein to the manual selector valve 55 for pressure augmentation when the manual selector is in R and P positions. The port 131 is connected to a branch conduit 133a of a conduit 133 which in turn is connected to the throttle valve 50.

The throttle valve 50 includes a slidable valve spool 134 having spaced lands 135 and 136. The valve spool 134 has a small bore 137 therein which communicates with a valve chamber 138. The throttle valve 50 has ports 139, 140 and 141. The port 139 is a drain port. The port 140 communicates with the conduit 133 while the port 141 communicates with a branch conduit 111a. Provided with a push rod 142 is a throttle modulator valve 143 which communicates with the intake manifold (not shown) of the engine. The throttle modulator valve 143 is operated in accordance with the variation in the intake manifold vacuum of the engine so that the push rod 142 moves toward the land 135. Consequently, the push rod 142 biases the valve spool 134 downwardly of the drawing. In this instance, the fluid pressure in the port 140 is drawn into the valve chamber 138 of the throttle valve 50 and thus acts on the lower end of the land 136. By this action, the fluid pressure is modulated to a value that is determined by the force acting on the land 135. Consequently, the fluid pressure in the conduit 133 rises when the throttle valve is fully open and falls when the throttle valve is slightly open, that is, when the intake manifold vacuum is relatively high. Thus, the fluid pressure in the port 140 responds to the intake manifold vacuum of the engine, and is utilized for varying the line pressure. The fluid pressure will be referred to as a throttle pressure hereinafter.

The throttle pressure in the conduit 133 is distributed to the port 131 of the amplifier piston 124 and ats on the land 127 to move the valve spool 125 upwardly of the drawing. This causes the valve spool 112 of the regulator valve 47 to move upwardly, thereby blocking the communication between the ports 119 and 121 and the communication between the ports 120 and 122. Thus, the line pressure is increased in the line pressure conduit 111. As the intake manifold vacuum increases, the line pressure in the regulator valve 47 is decreased accordingly. It will thus be understood that, as the throttle pressure increases, the line pressure increases.

Figure 5:
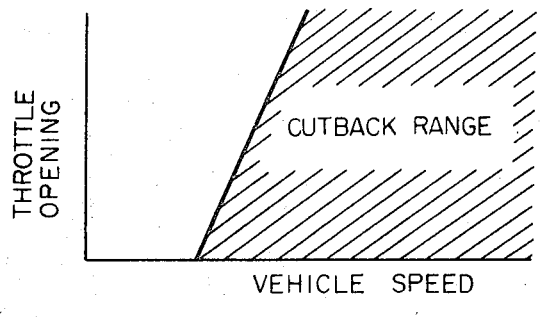
FIG. 5 is a graphical representation of a cutback range which is achieved where the hydraulic control system of FIG. 4 is used.

The throttle pressure in the conduit 133 is also distributed to the cutback valve 53 through a branch conduit 133b having an orifice 144 therein. The cutback valve 53 has a solenoid 145 for actuating a plunger 146 to open or close a nozzle 147 when energized by the line pressure control unit 76 (see FIG. 1). The cutback range of the cutback valve 53 is illustrated in FIG. 5.

The sectional area of the nozzle 147 is greater than that of the orifice 144, so that the fluid pressure in a fluid chamber 148 is lower than the throttle pressure in the conduit 133 when the nozzle is open.

The fluid pressure in the fluid chamber 148 is thus varied and passed through a conduit 149 to the port 117 of the regulator valve 47 for regulating the line pressure in the line pressure conduit 111. The line pressure thus regulated is then passed through a conduit 111b to the manual selector valve 55.

The manual selector valve 55 is operated by the manual selector lever 57 (see FIG. 1). As previously described, the selector lever 57 has the following positions: P or parking position, R or reverse position, N or neutral position, D or automatic forward drive position, 2 or manual second speed position, and 1 or manual first speed position. The manual selector valve 55 has corresponding positions, as indicated. The line pressure delivered to the manual valve 55 is supplied through the conduits 161 and 162 to the first shift valve 59.

The manual selector valve 55 includes a slidable valve spool 150 having spaced lands 151, 152 and 153. The manual valve 55 has a plurality of ports 154, 155, 156, 157, 158, 159 and 160. The port 154 communicates with the conduit 111b leading to the line pressure conduit 111; the port 155 communicates with the conduit 132; the port 156 is a drain port; the port 157 communicates with the conduit 161; the port 158 communicates with a conduit 162; the port 159 communicates with a conduit 163; and the port 160 communicates with a conduit 164 which in turn communicates with the rear clutch 16 through an orifice 164a.

The first shift valve 59 includes a slidable valve spool 165 having spaced lands 166, 167, 168 and 169. The shift valve 59 has a plurality of ports 170, 171, 172, 173 and 174. The port 170 selectively communicates with the port 172 while the port 171 selectively communicates with either of the ports 172 and 173. The port 174 is a drain port. A spring 175 is provided for biasing the valve spool 165 leftwardly of the drawing. On the land 166 is mounted a plunger 176 of the first solenoid 59a. The solenoid 59a, which may be of any suitable construction, is controlled by the solenoid control unit 71 in a manner previously described. The ports 172 and 173 communicate with conduits 177 and 178, respectively, which in turn communicate with the second shift valve 61.

The second shift valve 61 includes a slidable valve spool 179 having spaced lands 180, 181, 182, 183 and 184. The shift valve 61 has a plurality of ports 185, 186, 187, 188, 189, 190, 191 and 192. The ports 185 and 186 communicate with the conduits 178 and 177, respectively. The ports 187, 190 and 192 are drain ports. The ports 188, 189 and 191 communicate with the respective friction elements. A spring 193 is provided for biasing the valve spool 179 leftwardly of the drawing. On the land 180 is mounted a plunger 194 of the second solenoid 61a. The second solenoid 61a, which may be of any suitable construction, is controlled by the solenoid valve control unit 71, as described above.

The port 188 communicates with a conduit 195 which in turn communicates with the applying side of the servo mechanism 40 of the second brake 17 through an orifice 195a. The port 191 communicates with a conduit 196 having an orifice 196a therein which in turn communicates with the low and reverse brake 18.

The port 189 communicates with a conduit 197 which in turn communicates with the emergency low valve 65. The emergency low valve 65 includes a slidable valve spool 198 having spaced lands 199 and 200. A spring 201 is provided for biasing the valve spool 198 rightwardly of the drawing. The emergency low valve 65 has a plurality of ports 202, 203 and 204. The port 202 communicates with the conduit 197. The port 203 communicates with the conduit 163 leading to the manual selector valve 55. The port 204 communicates with a conduit 205 which in turn communicates with the releasing side of the servo mechanism 40 and communicates with the front clutch 15 through an orifice 206.

When the manual selector valve 55 is set to the P position, the valve spool 150 is moved so that the port 154 is brought into communication with the ports 157 and 155. The line pressure delivered to the port 157 is then passed through the conduit 161 to the port 170 of the first shift valve 59. In this instance, the first solenoid 59a is de-energized, so that the valve spool 165 is moved leftwardly of the drawing by the force of the spring 175. With the valve spool 165 in this position, the port 170 communicates with the port 172, so that the line pressure delivered to the port 172 is passed through the conduit 177 to the port 186 of the second shift valve 61. The second solenoid 61a is also de-energized, so that the valve spool 179 is moved leftwardly of the drawing by the force of the spring 193. Consequently, the port 186 communicates with the port 191, thereby admitting the line pressure into the conduit 196. Thus, the low and reverse brake 18 is engaged.

On the other hand, the line pressure admitted to the port 155 is passed through the conduit 132 to the port 130 of the amplifier piston 124. The line pressure in the port 130 then acts on the differential area between the lands 126 and 127, thereby moving the spool 125 upwardly of the drawing to increase the line pressure in the line pressure conduit 111. The purpose for engaging the low and reverse brake 18 and increasing the line pressure is to effect a quick shift from P position to the R position and to increase the torque capacity of the low and reverse clutch 18.

When the manual selector valve 55 is set to the R position, the line pressure is admitted to the same conduits as when the manual selector valve is set to the P position with the exception that the line pressure is delivered to the conduit 162. In this instance, both of the solenoids 59a and 61a are de-energized so that the communications between the ports 171 and 173 and between the ports 185 and 189 are established. Consequently, the line pressure delivered to the conduit 162 is passed through the conduits 178 and 197 to the port 202 of the emergency low valve 65. In this instance, there is present no line pressure acting on the land 200 since the line pressure is prevented from being supplied to the conduit 163, so that the valve spool 198 is moved rightwardly of the drawing by the force of the spring 201. With the valve spool 198 in this position, the port 202 communicates with the port 204, thereby admitting the line pressure to the front clutch 15 and the release side of servo mechanism 40 of brake 17. The front clutch 15 is then engaged and thus the reverse drive ratio is obtained.

When the manual selector valve 55 is set to the N position illustrated in FIG. 4, the line pressure delivered to the port 154 is admitted only to the conduit 161 through the port 157. In this instance, the low and reverse brake 18 is engaged as previously described. Thus, the transmission is set in its neutral condition with the result that the shocks resulting from the shifting from the N position to the R position are decreased.

When the manual selector valve 55 is moved to the D position the line pressure in the port 154 is admitted not only to the port 158 but also to the port 160. The line pressure admitted to the port 160 is directly passed through the conduit 164 to the rear clutch 16. Thus, the rear clutch 16 is always engaged for all forward speed ranges.

Since, the electronic control circuit operates to energize and de-energize the first and second solenoids 59a and 61a in a manner as prescribed in Table I, the forward speed range is determined by the shifting signals delivered to the solenoids 59a and 61a.

When the first speed shifting signal is generated by the solenoid control unit 71, both the first and second solenoids 59a and 61a are energized so that the plungers 176 and 194 are caused to protrude. Consequently, the spools 165 and 179 are moved rightwardly against the forces of the springs 175 and 193. In this instance, the port 171 communicates with the port 172, thereby passing the line pressure over to the port 186 through the conduit 177. The port 186 is, however, closed by the land 183 of the second shift valve 61, so that the line pressure is absent in the conduit 196. Thus, only the rear clutch 16 is engaged and, therefore, the first forward speed drive ratio is obtained by the action of the one-way clutch 21.

As the vehicle speed increases to the shifting point from the first to the second speed drive ratio, then the first solenoid 59a is de-energized with the second solenoid 61a kept energized by the solenoid control unit 71, so that the valve spool 165 of the first shift valve 59 is moved leftwardly of the drawing by force of the spring 175. In this instance, the port 171 communicates with the port 173, thereby passing the line pressure to the conduit 178. Since the port 185 communicates with the port 188, the line pressure delivered to the conduit 178 is admitted to the conduit 195 leading to the applying side of the actuator 40 to engage the second brake 17. The second speed drive ratio is thus established.

As the vehicle speed further increases, both of the first and second solenoids 59a and 61a are de-energized, so that the communications between the ports 171 and 173 and between the ports 185 and 189 are established. In this instance, the line pressure is absent in the port 203 of the emergency low valve 65, whereby the valve spool 198 is moved rightwardly of the drawing by the force of the spring 201 to establish the communication between the ports 202 and 204. Consequently, the line pressure delivered to the conduit 162 is then admitted through the conduits 178, 197 and 205 to the front clutch 15 and release side of the servo 40 of the second brake 17 and, therefore, the third speed drive ratio is reached.

When the manual selector valve 55 is moved to the 2 range position, the line pressure is admitted to the same conduit as when the manual selector valve 55 is in the D position when the vehicle is driven at the second speed drive ratio.

When the manual selector valve 55 is set to the 1 position, the line pressure is admitted to the ports 158, 159 and 160. With the manual selector valve 55 in this position, the first solenoid 59a is energized while the second solenoid 61a is de-energized, so that the communications between the ports 171 and 172 and between the ports 186 and 191 are established. The line pressure admitted to the conduit 162 is then passed through the conduits 177 and 196 to the low and reverse brake 18. Thus, the first speed drive ratio is obtained with the result that the engine braking is effected by the action of the low and reverse brake 18. If the electronic control system fails to complete its operation, either of the solenoids 59a and 61a becomes inoperative, so that, when the manual selector valve 55 is set to the D and 2 range positions, the third speed drive ratio is obtained. When, however, the manual selector valve 55 is set to the 1 range position, the line pressure delivered to the conduit 197 is prevented from being admitted to the conduit 205 leading to the front clutch 15 since the line pressure passed to the port 159 is admitted to the port 203 through the conduit 163 thereby acting on the land 200 of the emergency low valve 65. Under these conditions, the rear clutch 16 and the one-way clutch 21 become operative and thus the first speed drive ratio is obtained.

It will be apparent from the foregoing that, in accordance with the invention, a simplified automatic power transmission is provided by the use of a minimum number of shift valves.

Since, moreover, an electronic control system is connected to a brake switch adapted to generate a signal indicative of a motor vehicle speed being reduced engine braking is effected by automatic downshifting without moving a manual selector lever.

It should be also understood that, although the shift valve is shown to be directly operated by the solenoid valve, a suitable control device such as a solenoid pilot valve can be provided to hydraulically control the shift valve, if desired.

What is claimed is:

1. In an automatic power transmission for a motor vehicle driven by an engine which transmission has a drive shaft, a driven shaft, a plurality of planetary gear sets disposed between said drive and driven shafts, a plurality of clutch and brake means for controlling the relative motions of said planetary gear sets to provide a plurality of speed ratios including first, second and third forward speed ratios, said clutch and brake means having a low and reverse brake to provide an engine braking driving condition when engaged in the first forward speed ratio, and a one-way brake alternating with said low and reverse brake, said one-way brake serving to provide free-wheel driving in a power train when said low and reverse brake is disengaged in the first forward speed ratio, a control system comprising, in combination, a source of fluid under pressure; a manual selector valve hydraulically connected to said source of fluid under pressure and movable to a plurality of different positions including a manual first speed position, a manual second speed position and an automatic forward drive position; a first shift valve hydraulically connected to said manual selector valve to receive the fluid under pressure delivered therefrom, said first shift valve being movable to two different positions; a second shift valve hydraulically connected to said first shift valve and movable to two different positions; and a plurality of conduit means connected between said first and second shift valves and connected between said second shift valve and said clutch and brake means for supplying the fluid under pressure from said source of fluid pressure to said clutch and brake means; the arrangement being such that by selective combination of the two positions of said first shift valve with the two positions of said second shift valve, said plurality of conduit means are opened and closed to selectively supply the fluid under pressure to said clutch and brake means whereby the relative motions of said planetary gear sets are selectively controlled to provide a first forward speed ratio in which the power transmission provides the free-wheel driving, a first forward speed ratio in which the power transmission provides the engine braking driving condition, a second forward speed ratio and a third forward speed ratio.

2. A control system as claimed in claim 1, further comprising a regulator valve hydraulically connected to said source of fluid under pressure, and a cutback valve including a nozzle hydraulically connected to said regulator valve and an electric actuating means having a movable member movable toward and away from said nozzle, said movable member selectively closing said nozzle for producing a back pressure in said nozzle which back pressure is applied to said regulator valve to effect a cutback in the pressure of said fluid.

3. An automatic power transmission for a motor vehicle driven by an engine and having an accelerator pedal, comprising, in combination, a drive shaft; a driven shaft; a plurality of planetary gear sets disposed between said drive and driven shafts; a plurality of clutch and brake means for controlling the relative motions of said planetary gear sets to provide a plurality of speed ratios including first, second and third forward speed ratios, said clutch and brake means having a low and reverse brake to provide an engine braking driving condition when engaged in the first forward speed ratio; a one-way brake alternating with said low and reverse brake and serving to provide a free-wheel driving condition when said low and reverse brake is disengaged; a source of fluid under pressure; a manual selector valve hydraulically connected to said source of fluid under pressure and movable to a plurality of different positions including a manual first speed position, a manual second speed position and an automatic forward drive position; a first shift valve hydraulically connected to said manual selector valve to receive the fluid under pressure delivered therefrom, said first shift valve being movable to two different positions; a second shift valve hydraulically connected to said first shift valve and movable to two different positions; a plurality of conduit means connected between said first and second shift valves and connected between said second shift valve and said clutch and brake means for supplying the fluid under pressure to said clutch and brake means; the arrangement being such that by selective combination of the two positions of said first shift valve with the two positions of said second shift valve, said plurality of conduit means are opened and closed to selectively supply the fluid under pressure to said clutch and brake means whereby the relative motions of said planetary gear sets are selectively controlled to provide a first forward speed ratio in which the power transmission provides the free-wheel driving, a first forward speed ratio in which the power transmission provides the engine braking driving condition, a second forward speed ratio and a third forward speed ratio; first electric sensing means connected to said driven shaft to sense the rotational speed of said driven shaft and generating a first voltage signal proportional thereto; second electric sensing means linked with said accelerator pedal to sense the degree of displacement of said accelerator pedal and generating a second voltage signal proportional thereto; a shift pattern generator unit having first and second inputs electrically connected to said first and second electric sensing means and receiving said first and second voltage signals, respectively, and having first and second outputs, said shift pattern generator unit including first and second comparing means electrically connected to said first and second inputs for comparing said first and second voltage signals and generating first and second output signals at said first and second outputs, respectively, when the sum of said first and second voltage signals exceed first and second predetermined values, said first and second output signals being related to said different positions of said first and second shift valves for thereby providing said first forward speed ratios, second forward speed ratio and third forward speed ratio; a solenoid control unit including first and second circuit means electrically connected to said first and second outputs of said shift pattern generator unit and receiving said first and second output signals; and first and second solenoids electrically connected to said solenoid control unit and controlled thereby in response to said first and second output signals, said first and second solenoids cooperating with said first and second shift valves for moving said first and second shift valves in the respective two different positions.

4. A control system as claimed in claim 3, further comprising a regulator valve hydraulically connected to said source of fluid under pressure, and a cutback valve including a nozzle hydraulically connected to said regulator valve and an electric actuating means having a movable member movable toward and away from said nozzle, said movable member selectively closing said nozzle for producing a back pressure in said nozzle which back pressure is applied to said regulator valve to effect a cutback in the pressure of said fluid.

5. An automatic power transmission as claimed in claim 4, further comprising an emergency low valve which is interposed in at least one of said conduit means, said emergency low valve including a slidable valve spool which is movable to a position to close said one of said conduit means for preventing the fluid under pressure from being supplied to said clutch and brake means for thereby preventing upshifting from the first speed ratio to the third speed ratio.

6. An automatic power transmission for a motor vehicle driven by an engine and having an accelerator pedal, comprising, in combination, a drive shaft; a driven shaft; a plurality of planetary gear sets disposed between said drive and driven shafts; a plurality of clutch and brake means for controlling the relative motions of said planetary gear sets to provide a plurality of speed ratios including first, second and third forward speed ratios, said clutch and brake means having a low and reverse brake to provide an engine braking driving condition when engaged in the first forward speed ratio; a one-way brake alternating with said low and reverse brake and serving to provide a free-wheel driving condition when said low and reverse brake is disengaged; a source of fluid under pressure; a manual selector valve hydraulically connected to said source of fluid under pressure and movable to a plurality of different positions including a manual first speed position, a manual second speed position and an automatic forward drive position; a first shift valve hydraulically connected to said manual selector valve to receive the fluid under pressure delivered therefrom, said first shift valve being movable to two different positions; a second shift valve hydraulically connected to said first shift valve and movable to two different positions; a plurality of conduit means connected between said first and second shift valves and connected between said second shift valve and said clutch and brake means for supplying the fluid under pressure to said clutch and brake means; the arrangement being such that by selective combination of the two positions of said first shift valve with the two positions of said second shift valve, said plurality of conduit means are opened and closed to selectively supply the fluid under pressure to said clutch and brake means whereby the relative motions of said planetary gear sets are selectively controlled to provide a first forward speed ratio in which the power transmission provides the free-wheel driving, a first forward speed ratio in which the power transmission provides the engine braking driving condition, a second forward speed ratio and a third forward speed ratio; first electric sensing means connected to said driven shaft to sense the rotational speed of said driven shaft and generating a first voltage signal proportional thereto; second electric sensing means linked with said accelerator pedal to sense the degree of displacement of said accelerator pedal and generating a second voltage signal proportional thereto; third electric sensing means to sense an inclination of the motor vehicle and generating a third voltage signal when the inclination of the motor vehicle is below a predetermined value; a shift pattern generator unit having first, second and third inputs electrically connected to said first, second and third electric sensing means and receiving said first, second and third voltage signals, respectively, and having first and second outputs, said shift pattern generator unit including first and second comparing means electrically connected to said first and second inputs for comparing said first and second voltage signals and generating first and second output signals at said first and second outputs, respectively, when the sum of said first and second voltage signals exceed first and second predetermined values and including first and second circuit means electrically connected to said first and second comparing means, respectively, said first and second circuit means being also electrically connected to said third input and said first input and serving to increase the level of said first voltage signal to be delivered to said first and second comparing means for thereby raising shifting points to a higher vehicle speed side when said third voltage signal is absent at said third input, said first and second output signals being related to said different positions of said first and second shift valves for thereby providing said first forward speed ratios, second forward speed ratio and third forward speed ratio; a solenoid control unit including first and second circuit means electrically connected to said first and second outputs of said shift pattern generator unit and receiving said first and second output signals; and first and second solenoids electrically connected to said solenoid control unit and controlled thereby in response to said first and second output signals, said first and second solenoids cooperating with said first and second shift valves for moving said first and second shift valves to the respective two different positions.

7. An automatic power transmission as claimed in claim 6, further comprising an emergency low valve which is interposed in at least one of said conduit means, said emergency low valve including a slidable valve spool which is movable to a position to close said one of said conduit means for preventing the fluid under pressure from being supplied to said clutch and brake means for thereby preventing upshifting from the first ratio to the third speed ratio.

8. A control system as claimed in claim 7, further comprising a regulator valve hydraulically connected to said source of fluid under pressure, and a cutback valve including a nozzle hydraulically connected to said regulator valve and an electric actuating means having a movable member movable toward and away from said nozzle, said movable member selectively closing said nozzle for producing a back pressure in said nozzle which back pressure is applied to said regulator valve to effect a cutback in the pressure of said fluid.

* * * * *